United States Patent
Evans et al.

(10) Patent No.: US 9,423,144 B2
(45) Date of Patent: *Aug. 23, 2016

(54) CONTROLLING A CLIMATE CONTROL APPLIANCE IN RESPONSE TO A REDUCED OPERATION REQUEST

(75) Inventors: Edward B. Evans, Maryland Heights, MO (US); Carl J. Mueller, St. Louis, MO (US); John M. Sartain, St. Louis, MO (US); James P. Garozzo, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/471,180

(22) Filed: May 14, 2012

(65) Prior Publication Data

US 2012/0226388 A1   Sep. 6, 2012

Related U.S. Application Data

(60) Continuation-in-part of application No. 12/857,680, filed on Aug. 17, 2010, now Pat. No. 8,177,139, and a continuation of application No. 11/801,855, filed on May 11, 2007, now Pat. No. 7,775,454, and a division of application No. 11/156,973, filed on Jun. 20, 2005, now Pat. No. 7,364,093.

(51) Int. Cl.
*F24F 11/00* (2006.01)
*G05D 23/19* (2006.01)
*F24D 19/10* (2006.01)

(52) U.S. Cl.
CPC ........ *F24F 11/0012* (2013.01); *F24D 19/1006* (2013.01); *G05D 23/1923* (2013.01); *F24F 2011/0064* (2013.01); *F24F 2011/0075* (2013.01)

(58) Field of Classification Search
CPC ............... F24F 11/0012; F24F 2011/0064; F24F 2011/0075; F24D 19/1006; G05D 23/1923
USPC ................................ 236/1 C, 46 R, 51, 94
See application file for complete search history.

(56) References Cited

U.S. PATENT DOCUMENTS 4,228,511 A  * 10/1980  Simcoe et al. ................ 700/278
4,341,345 A     7/1982  Hammer et al.

(Continued)

OTHER PUBLICATIONS

PCT/ISA/210 International Search Report regarding PCT/US08/63180 dated Sep. 25, 2008; 4 pgs.

(Continued)

*Primary Examiner* — Marc Norman
(74) *Attorney, Agent, or Firm* — Harness, Dickey & Pierce, P.L.C.

(57) ABSTRACT

Controllers and methods for controlling operation of a climate control appliance for heating and/or cooling a space are provided. One example controller includes a memory for storing at least one temperature offset and a processor coupled to the memory. The processor is configured to receive the reduced operation request from at least one of a utility provider and a user of the controller, to receive a sensed temperature from at least one sensor disposed within the space, and to determine an artificial temperature based on the sensed temperature and the at least one temperature offset associated with the reduced operation request. The processor is configured to, in response to the reduced operation request, operate the climate control appliance based on a comparison of the set-point temperature and artificial temperature during a reduced operation interval, to thereby reduce operation of the climate control appliance in response to the reduced operation request.

25 Claims, 6 Drawing Sheets

(56) References Cited

U.S. PATENT DOCUMENTS

| | | |
|---|---|---|
| 4,389,577 A | 6/1983 | Anderson et al. |
| 4,577,977 A * | 3/1986 | Pejsa .................... 374/39 |
| 4,881,686 A | 11/1989 | Mehta |
| 6,213,404 B1 * | 4/2001 | Dushane et al. ............. 236/51 |
| 6,216,956 B1 * | 4/2001 | Ehlers et al. ............... 236/47 |
| 6,480,803 B1 | 11/2002 | Pierret et al. |
| 6,513,723 B1 * | 2/2003 | Mueller et al. ............ 236/46 R |
| 6,622,926 B1 | 9/2003 | Sartain et al. |
| 6,868,293 B1 * | 3/2005 | Schurr et al. ............. 700/22 |
| 7,364,093 B2 | 4/2008 | Garozzo |
| 7,513,438 B2 | 4/2009 | Mueller |
| 7,775,454 B2 | 8/2010 | Mueller et al. |
| 2004/0139038 A1 | 7/2004 | Ehlers et al. |
| 2005/0033707 A1 | 2/2005 | Ehlers et al. |
| 2006/0036350 A1 * | 2/2006 | Bohrer et al. ............. 700/276 |
| 2006/0186213 A1 | 8/2006 | Carey et al. |
| 2011/0000659 A1 | 1/2011 | Mueller et al. |

OTHER PUBLICATIONS

PCT/ISA/237 Written Opinion of the International Searching Authority regarding PCT/US08/63180 dated Sep. 25, 2008; 6 pgs.

* cited by examiner

CONTROLLING A CLIMATE CONTROL APPLIANCE IN RESPONSE TO A REDUCED OPERATION REQUEST

CROSS-REFERENCE TO RELATED APPLICATIONS

This application is a continuation-in-part of U.S. patent application Ser. No. 12/857,680 filed Aug. 17, 2010 (which issues May 15, 2012 as U.S. Pat. No. 8,177,139), which is a continuation of U.S. patent application Ser. No. 11/801,855 filed on May 11, 2007, now U.S. Pat. No. 7,775,454, issued Aug. 17, 2010, which claims priority to U.S. patent application Ser. No. 11/156,973, filed Jun. 20, 2005, now U.S. Pat. No. 7,364,093, issued Apr. 29, 2008, entitled "Thermostat Having Default Curtailment Temperature Settings". The entire disclosures of each of the above applications are incorporated herein by reference.

FIELD

The present disclosure relates to controllers for controlling the level of operation of one or more systems to correspond with a time-of-use energy rate, and to controllers that can respond to reduced operation requests.

BACKGROUND

This section provides background information related to the present disclosure which is not necessarily prior art.

As the demand for electrical power increases during the day, the utility provider experiences an increase in the cost of generating electrical power as a result of secondary "peak" power plants that are switched on to supplement off-peak power generating plants. In situations where the peak demand begins to exceed the power generating capacity of the utility's off-peak and peak power plants, the utility may engage in demand side management, which curtails or reduces consumer energy usage to keep the demand from exceeding capacity. Utilities engaging in demand side management transmit a signal to various users of electrical energy to reduce the amount of energy they use during peak demand periods by turning off electrical loads such as air conditioners. In the example of an air conditioner controlled by a conventional thermostat, the utility provider may request reduced air conditioner operation by changing the set-point temperature of the thermostat. Previous attempts have been made to provide a load-shedding thermostat that can offset the temperature set-point to reduce the amount of energy used during peak demand periods. This would allow the utility to be able to lower energy consumption to keep the peak demand from exceeding their capacity, and the user would be able to save on their energy bill. However, this method of offsetting the temperature setting of a thermostat by a predetermined amount cannot always be relied upon to reduce the operating level of the air conditioner, since the user may respond to the displayed change in set-point temperature by over-riding the utility change to the set-point temperature setting.

SUMMARY

This section provides a general summary of the disclosure, and is not a comprehensive disclosure of its full scope or all of its features.

According to one aspect of the present disclosure, a control system for controlling a climate control appliance for heating and/or cooling a space is provided. The control system includes at least one sensor configured to sense a temperature associated with the space, a memory for storing at least one temperature offset, and a processor coupled to the memory and in communication with the at least one sensor. The processor is configured to receive a reduced operation request and to receive a sensed temperature from the at least one sensor. The processor is configured to determine an artificial temperature based on the sensed temperature and the at least one temperature offset associated with the reduced operation request. The processor is configured, in response to the reduced operation request, to operate the climate control appliance based on a comparison of the set-point temperature and the artificial temperature during a reduced operation interval, to thereby reduce operation of the climate control appliance in response to the reduced operation request.

According to another aspect of the present disclosure, a controller for controlling a climate control appliance for heating and/or cooling a space is provided. The controller includes a memory for storing at least one temperature offset and a processor coupled to the memory. The processor is configured to receive the reduced operation request from at least one of a utility provider and a user, to receive a sensed temperature from at least one sensor disposed within the space, and to determine an artificial temperature based on the sensed temperature and the at least one temperature offset associated with the reduced operation request. The processor is further configured to, in response to the reduced operation request, operate the climate control appliance based on a comparison of the set-point temperature and the artificial temperature during a reduced operation interval, to thereby reduce operation of the climate control appliance in response to the reduced operation request.

According to yet another aspect of the present disclosure, a method for controlling operation of a climate control appliance for heating and/or cooling a space. The method includes sensing a temperature associated with the space, receiving a reduced operation request, determining an artificial temperature based on the sensed temperature and a temperature offset associated with the reduced operation request, and in response to the reduced operation request, operating the climate control appliance based on a comparison of the artificial temperature and a set-point temperature for at least a reduced operation interval.

Another exemplary embodiment of a method generally includes determining an artificial temperature value for a space based on sensed temperature value information indicative of a sensed temperature within a space, which is offset by at least one sensed temperature offset value when a controller has received a request for reduced operation from a user or a utility provider within a predetermined time period. The method also includes controlling operation of the heating and/or cooling system for the space to discontinue operation when the determined artificial temperature value has reached or is within a fraction of a degree above or below a set-point temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 shows a space temperature over a given time period in which an exemplary embodiment of a thermostat and method control air conditioner operation using an offset, in response to a first request for reduced operation;

FIG. 2. shows a space temperature over a given time period in which air conditioner operation is controlled using a second offset, in response to a second request for reduced operation;

DETAILED DESCRIPTION

Figure 1:
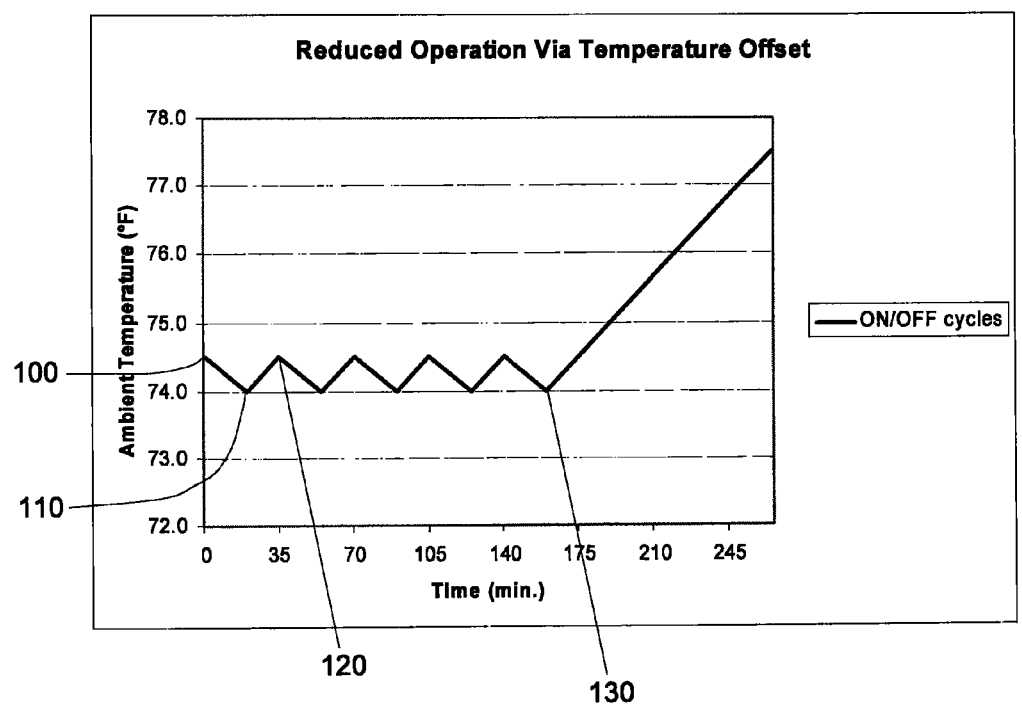

The following description is merely exemplary in nature and is not intended to limit the present disclosure, application, or uses. It should be understood that throughout the drawings, corresponding reference numerals indicate like or corresponding parts and features.

According to various aspects of the present disclosure, there are provided various exemplary embodiments of controllers, such as thermostats, that include a feature enabling a request for reduce cooling or heating operation. In the various embodiments, a controller is provided that is configured to hold or maintain a select set-point temperature setting. The various disclosed thermostat embodiments are at least configurable to operate in a "Hold" temperature mode, which controls cooling or heating to the space to hold or maintain the user's selected set-point temperature. In some embodiments, the thermostat may be configured to provide at least two or more programmed set-point temperature settings that correspond to specific time periods of operation, such as day or night time periods. In the "Hold" mode, the thermostat controls the operation of a heating or cooling system to continuously condition the space, to hold the space temperature at the user's select set-point temperature. If the space does not feel comfortable to the user, the various thermostat embodiments allow a user to temporarily adjust the "Hold" temperature setting by pressing the temperature up or down buttons, to request a higher or lower setting for a short time period. For example, the user may press the down arrow to lower the "Hold" temperature set-point of 72 degrees to 70 degrees Fahrenheit, in response to which a standard sub-routine within the thermostat's software program would control cooling to maintain the space at 70 degrees for a temporary two-hour time period, after which the thermostat would return to normal "Hold" mode to maintain the 72 degree set-point temperature.

The various embodiments of a thermostat further comprise at least one temperature responsive device that at least periodically outputs a variable or value that is indicative of the temperature in the space. The sensor may be any of a number of sensor types, and may comprise a crystal, oscillator or other electronic component having a frequency that responsively changes with temperature. Alternatively, the sensor may comprise a thermistor having a resistance value that changes in response to changes in temperature. The sensor could also be a device capable of communicating a voltage value that correlates to, or is indicative of, the temperature sensed in the space. The sensor may include circuitry to permit the sensor to communicate an absolute value of the temperature to a tenth of degree Fahrenheit. Likewise, the sensor may also include circuitry to enable communication of temperature information on a periodic basis, or upon request, such as when prompted by a microprocessor of the thermostat. Accordingly, the at least one sensor in the various embodiments is configured to sense and communicate information that is indicative of the temperature in the space.

The various embodiments of a thermostat further include a controller that is in communication with the at least one sensor. Since the sensed temperature varies over time, the controller is configured to periodically determine a temperature value for the space, which is stored as the current temperature value for the space. Each time the thermostat controller determines or updates the temperature value for the space, the controller uses information communicated from the at least one sensor in determining the space temperature value, which is then stored in a memory. The stored value may, for example, replace a previously stored space temperature value, or may be stored as part of a database of historical temperature values over time. Since the space temperature value varies over time and must be repeatedly determined by the controller, the controller may readily offset the determined temperature value prior to storing the space temperature value in memory. For example, the software associated with the thermostat's controller may, in its determination of the space temperature value, include an offset value when a certain condition is true (such as the receipt of a request for reduced heating or cooling operation within a predetermined time period). Such a software provision enables the changing of the space temperature value to effect a reduction in operation, without requiring software complexity or subroutines that are required to allow a utility provider to change the set-point temperature to reduce operation.

It should be noted that offsetting the space temperature is not the same as changing the thermostat's set-point temperature setting. If the thermostat's controller were configured to permit a Utility provider to temporarily change the thermostat's cooling set-point temperature, the thermostat would likely require a "load-shed" subroutine to deviate from normal operation and control cooling operation to the utility's changed set-point temperature for a temporary duration. The controller may also need to be configured to allow the user to override the utility provider's set-point and subsequently change the set-point temperature again, which would likely require another sub-routine for deviating from the previous "load-shed" subroutine. Changing the set-point temperature would therefore lead to greater software and controller costs. For cost reasons, thermostats are designed to use programs of minimal size, with simple microprocessors having a limited memory. A software configuration that permits a utility provider to change the set-point temperature would require a sub-routine for deviating from normal operation, to enable interim control for a temporary time period using the Utility provider's changed set-point temperature (which change would also be displayed on the thermostat's display). This type of additional subroutine can add to the complexity and size of the software program, and may necessitate a more costly and sophisticated microprocessor to accommodate the size of the software, thereby increasing the thermostat's cost.

Moreover, permitting a utility provider to change the set-point temperature would be less effective in reducing operation to shed energy demand, since the user would readily see the Utility's change to the set-point temperature on the display of the thermostat, and would be more tempted to override the Utility's changed set-point. Thus, a set-point temperature change scheme accordingly requires the inclusion of subroutines that add to the software's complexity and the controller's memory requirements for the thermostat, and still would not adequately assure curbing of energy consumption through reduced heating or cooling operation.

The various embodiments of a thermostat do not alter the set-point temperature of the thermostat upon receiving a request for reduced heating or cooling operation. Rather, the various embodiments provide a thermostat that displays a current temperature value for the space (e.g., 73° F., etc.), and the set-point temperature (e.g., 72° F., etc.). In the above temperature situation, the thermostat would establish cooling operation to reduce the 73° F. temperature. Where a Utility provider's request for reduced cooling operation is received by the thermostat, the controller subsequently determines a space temperature value that includes, or is reduced by the at least one offset (e.g., to 70° F., etc.), which artificially reduces the space temperature value relative to the unchanged set-point temperature. It should be noted that the temperature offset value is preferably within the range of 1 to 8 degrees Fahrenheit. Such an offset to the space temperature would thereby satisfy the set-point temperature and end cooling operation to thereby reduce the demand for energy. Thus, the displayed set-point temperature selected by the user remains unchanged, while the displayed space temperature is transparently lowered. As such, the user would perceive the space to be cooled to the user's selected set-point temperature. Such a configuration simplifies the use of load-shedding thermostat for the user, since the user would only see the display of the user's selected set-point temperature and the display of the determined temperature value for the space. Since this type of request for reduced operation would be transparent to the user (as the user's set-point temperature setting would remain unchanged), the user would be less likely to opt out, or override the utility's request for reduced cooling operation. Accordingly, the various embodiments comprise a controller configured to periodically determine a space temperature value that can include at least one offset, to allow for effectively reducing heating or cooling operation where a request for reduced operation has been received (by a utility provider for example). The request for reduced operation is preferably a signal transmitted by a utility provider that is received by the thermostat, either by wireless transmission means or through power-line transmission means. It should be noted that the request for reduced operation may also be an energy savings mode that the user may change from a normally disabled default setting to an enabled setting, such that the thermostat initiates reduced operation during "peak" energy demand periods at the user's request. Such thermostat embodiments do not require any software subroutines for deviating from normal operation. The following description of one embodiment is given as an example to illustrate this advantageous feature.

In one embodiment, a load-shedding thermostat is provided for controlling the operation of at least a cooling system for conditioning a space. The thermostat comprises at least one sensor that is configured to communicate information indicative of the temperature within the space. In the first embodiment, the sensor produces a signal that increases in frequency with an increase in temperature, or a signal that increases in resistance with an increase in temperature. The sensor signal communicates information, or a value, that is indicative of the sensed temperature in the space, which value is received by a controller of the thermostat and converted to a temperature value.

The first embodiment of a thermostat further comprises a memory for storing at least one temperature offset value associated with at least one request for reduced cooling operation. The at least one offset value may be a value that incrementally changes with operating time, or may be a predetermined value associated with a particular degree of curtailment. Where a request has been received for reduced cooling (as opposed to reduced heating), the at least one temperature offset in the first embodiment comprises a offset value of −3 degrees Fahrenheit. The at least one temperature offset may further include a second offset of −3 degrees Fahrenheit, which may be associated with a tiered energy usage rate or a second request for additional reduced cooling operation, for example. Thus, the temperature offset value may comprise a plurality of incremental offset values that incrementally offset the space temperature to provide for reduced cooling in response to successive requests for reduced operation. The offset values are stored in a memory that is preferably a non-volatile electronically erasable programmable read-only memory (EEPROM). This memory may be a stand-alone memory component, but is preferably included in a microprocessor controller of the thermostat.

The first embodiment of a thermostat further includes a controller in communication with the at least one sensor, which controller is preferably a microprocessor that includes a software program for controlling the operation of at least a cooling system. The microprocessor controller is configured to periodically determine a temperature value for the space and to control cooling of the space until the determined space temperature value has substantially reached the set-point temperature. It should be noted that the controller may discontinue cooling operation when the space temperature value is within a fraction of a degree above or below the set-point temperature, rather than the exact moment that the set-point temperature is reached.

The microprocessor controller determines the temperature value for the space based on information received from the at least one sensor, and may include at least one temperature offset value in determining the space temperature value where a request for reduced operation has been received within a predetermined time period. The software associated with the thermostat's controller is configured to, in its determination of the space temperature value, include an offset value when a certain condition is true, such as where a request for reduced cooling operation has been received by the thermostat within a predetermined time period. It should be noted however, that similar programming means employed in software may also be used, which are suitable for providing a conditional offset to a determined value. The thermostat further comprises a display device that displays to the user the set-point temperature, and the determined temperature value for the space, without any indication of whether the temperature value for the space includes a temperature offset value.

Where a request for reduced operation has been received within a predetermined time period, the controller includes at least one temperature offset value in determining the space temperature value. The predetermined time period may comprise a three hour period, for example, which would allow a utility provider to communicate a signal to request reduced cooling operation that would remain in effect for three hours.

During this predetermined time period or interval, the thermostat's microprocessor controller would continue to offset the determined temperature value for the space. The offset would artificially lower the space temperature value, such that the set-point temperature is either satisfied or more quickly reached, to thereby reduce the need for cooling operation.

For example, in the situation of a thermostat with a user-selected set-point temperature of 72 degrees Fahrenheit, in a space that is at 73 degrees Fahrenheit, the thermostat would control the operation of the cooling system to lower the space temperature to 72 degrees. Upon receiving a request for reduced operation (from either a Utility provider or the user of the thermostat), the thermostat's controller would offset the space temperature value by −3 degrees, to 70 degrees Fahrenheit. Since the 70 degree space temperature value is below the 72 degree set-point temperature value, the thermostat controller would discontinue cooling operation. The cooling system would remain off for a substantial time period, until the 70 degree space temperature value slowly rises above the 72 degree set-point temperature. This would have the effect of reducing the operation of the cooling system, to thereby reduce energy demand on the utility provider.

During the predetermined time period, the controller may be configured (by a Utility provider, for example) to discontinue cooling operation for at least a minimum off-time period after the space temperature value has substantially reached the set-point temperature, to thereby provide a minimum off time that will further reduce operation of the cooling system after the initial offset. After the predetermined time period has transpired, the controller is configured to subsequently determine a space temperature value that is absent any temperature offset value, since the request for reduced operation received by the thermostat is no longer within the predetermined time period. Thus, the request for reduced operation is discontinued after the predetermined time period or interval following the receipt of the request has transpired. At such point, the thermostat returns to normal operation of maintaining the 72 degree set-point temperature.

In the first embodiment of a thermostat, the displayed 72 degree set-point temperature selected by the user remains unchanged, while the displayed space temperature is transparently lowered to 70 degrees. As such, the user would perceive the space to be cooled to the user's 72 degree set-point temperature. Since this type of request for reduced operation would be transparent to the user, the user would be less likely to over-ride the utility's request for reduced cooling operation, through adjustment of the temperature. Accordingly, the first embodiment of a thermostat provides for effectively reducing cooling operation where a request for reduced operation has been received from a Utility provider, or alternatively a user of the thermostat. However, should an occupant of the space feel uncomfortable, the occupant may temporarily adjust the "Hold" set-point temperature setting by pressing the temperature up or down buttons, to request a higher or lower setting for a short time period. For example, an occupant or user may press the down arrow to lower the "Hold" temperature set-point of 72 degrees to 70 degrees Fahrenheit, in response to which a standard sub-routine within the thermostat's software program would control cooling to maintain the space at 70 degrees for a temporary two-hour time period. No additional software subroutines would therefore be required to over-ride the utility's request for "load-shed" or reduced operation. As such, a thermostat is provided with load-shedding and over-ride capability that does not require software complexity or more costly sophisticated microprocessor control.

For purposes of illustration only, the operation of an air conditioner may be controlled by a thermostat and method according to the first embodiment as described in the following exemplary scenario. Referring to FIG. 1, a chart is provided illustrating the temperature of a space over a given time period, during which the thermostat successively initiates operation of the air conditioner. For illustrative purposes, the scenario assumes a conditioned space that experiences an increase of 2 degrees Fahrenheit per hour during the daytime when outside ambient temperatures reach their peak.

Referring to FIG. 1 at 100, the thermostat determines that the calculated temperature value for the space is at least 0.5 degrees Fahrenheit above a 74 degree set-point temperature, and initiates operation of the air conditioner. The air conditioner runs for approximately 20 minutes, after which the thermostat's determined temperature value for the space is 74 degrees, and the air conditioner is shut off at 110. During the next 15 minutes, the temperature in the space gradually increases at a rate of 2 degrees Fahrenheit per hour, and reaches 74.5 degrees Fahrenheit at 120. The thermostat responsively initiates operation of the air conditioner in a cyclic manner, up to point 130. At 130, the thermostat then receives a request for reduced operation, from an occupant or a Utility provider for example. The thermostat then calculates a determined temperature value for the space, which is determined based on information received from the at least one sensor, and at least one temperature offset value associated with a request for reduced operation. In this illustrative example, the temperature offset is −3 degrees Fahrenheit. The determined temperature value for the space is then 74 less 3 degrees, or 71 degrees. Accordingly, the thermostat would compare the determined temperature value for the space of 71 degrees Fahrenheit relative to the 74 degree set-point temperature. The thermostat would accordingly maintain the air conditioner in an off state as the actual temperature gradually increases to an actual temperature of 77.5 degrees Fahrenheit, or a determined temperature value of 77.4 degrees, after which the thermostat would again initiate operation of the air conditioner in a cyclic manner. This would result in a total "off" time of an hour and forty-five minutes in which energy would be saved during a peak temperature or energy demand period. It should be noted that in the various disclosed embodiments, the thermostat may alternatively be configured to determine temperature values in degrees Celsius, and may include offset values that are also in degrees Celsius.

In another illustration, a second request for curtailment of air conditioning operation is further described in the following exemplary scenario shown in FIG. 2, which shows a chart illustrating the temperature of a space over a given time period. The conditioned space similarly experiences an increase of 2 degrees Fahrenheit per hour as above, and has received a previous request for reduced operation that led to a −3 degree temperature offset.

Figure 2:
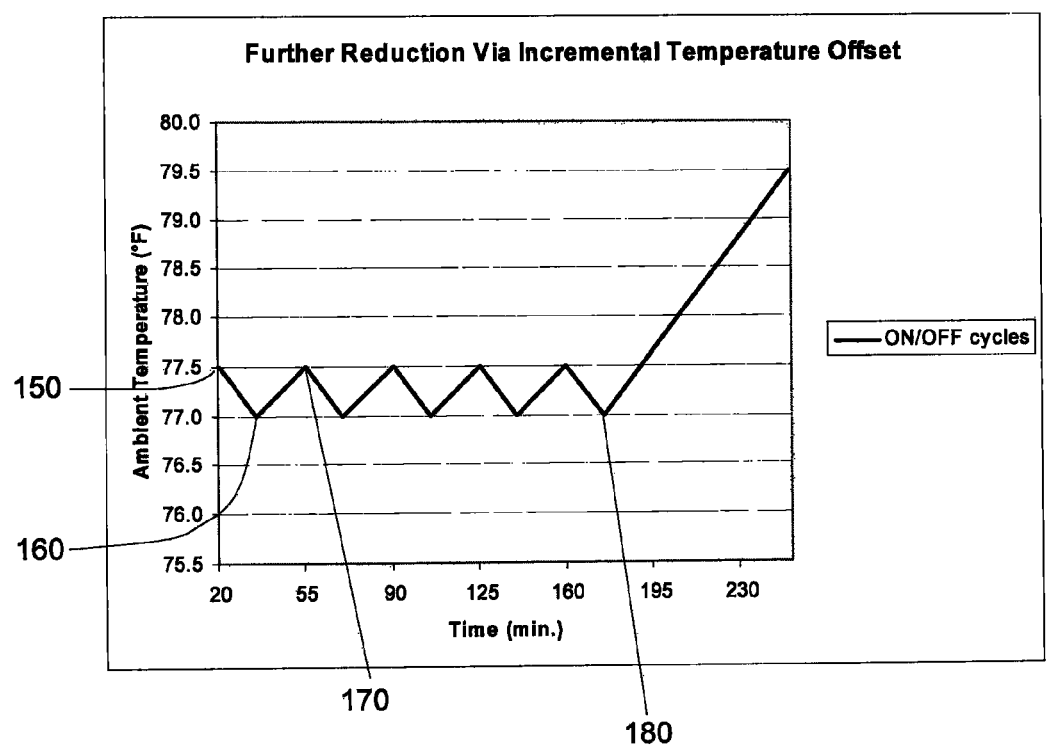

Referring to FIG. 2 at 150, the thermostat continues operation leaving off after the end of the above scenario. The thermostat calculates a determined temperature value for the space as 77.5 degrees Fahrenheit, less a 3 degree offset, to reach 74.5 degrees Fahrenheit. This determined temperature for the space is at least 0.5 degrees Fahrenheit above the 74 degree set-point temperature, such that the thermostat initiates operation of the air conditioner. The air conditioner runs for approximately 20 minutes, after which the thermostat's determined temperature value for the space is 74 degrees, and the air conditioner is shut off at 160. During the next 15 minutes, the temperature in the space gradually increases at a rate of 2 degrees Fahrenheit per hour, and reaches an actual temperature of 77.5 degrees Fahrenheit, or a determined temperature for the space of 77.4 degrees Fahrenheit. At 170, the thermostat responsively initiates operation of the air conditioner in a cyclic manner, up to point 180. At 180, the thermostat then receives a subsequent request for further reduction in operation, such as during a critical peak demand period. The thermostat then calculates a determined temperature value for the space, which is determined based on information received from the at least one sensor, and a temperature offset value associated with a second request for reduced operation. In this illustrative example, the temperature offset is −5 degrees Fahrenheit. The determined temperature value for the space is then 77 less 5 degrees, or 72 degrees. Accordingly, the thermostat would compare the determined temperature value for the space of 72 degrees Fahrenheit relative to the 74 degree set-point temperature. The thermostat would accordingly maintain the air conditioner in an off state as the actual temperature gradually increases to 79.5 degrees Fahrenheit, after which the thermostat would again initiate operation of the air conditioner in a cyclic manner. This would result in an additional "off" time of an hour and fifteen minutes beyond the first hour and forty-five minute period, in which period energy would be saved during a peak temperature or energy-demand period of the day.

The above incremental offsets to the space temperature both artificially allow the thermostat to satisfy the set-point temperature and end cooling operation to thereby reduce the demand for energy. The displayed set-point temperature of 74 degrees remains unchanged, while the displayed space temperature is transparently lowered. As such, the user would perceive the space to be cooled to the desired set-point temperature, and the request for reduced operation would be transparent to the user (as the user's set-point temperature setting would remain unchanged). Accordingly, the user would be less likely to over-ride a request for reduced cooling operation, and would still have a sufficiently cool temperature for the space relative to peak outside ambient temperatures.

In another aspect of the present disclosure, a method is provided for controlling the operation of a thermostat that is capable of receiving a request for reduced operation of a heating or cooling system for a space, such as during a period of peak energy demand. In one embodiment, the method comprises storing in a memory at least one temperature offset value associated with a request for reduced cooling operation. The method further comprises the steps of receiving the communication of information indicative of the temperature within a space from at least one sensor, and periodically determining a temperature value for the space. The periodic determination of a temperature value is determined based on information received from the at least one sensor, and at least one temperature offset value when a request for reduced operation has been received within a predetermined time period. The method then controls operation of the heating or cooling system for the space until the determined temperature value has substantially reached the set-point temperature. The method preferably includes the at least one temperature offset value in the determination of a temperature value for the space for a predetermined time period or interval after a request for reduced heating or cooling operation has been received.

Figure 3:
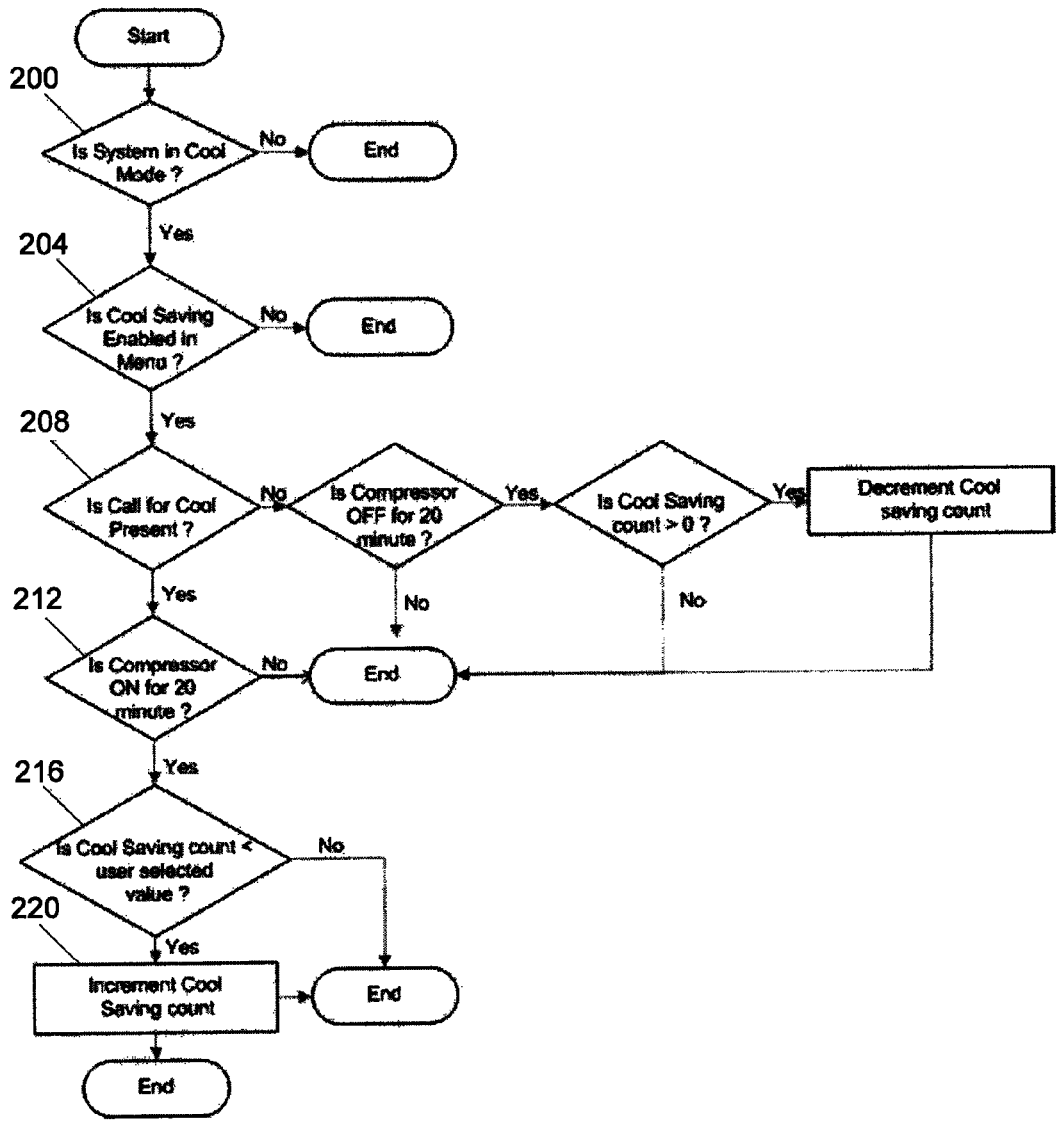
FIG. 3 shows a flow chart for a second exemplary embodiment of a thermostat and method according to principles of the present disclosure.

It should be noted that other embodiments of a system and method may be employed that comprise a number of offset values, where the offset value varies or is incrementally changed with operating time, for example. Referring to FIG. 3, an example of a second embodiment of an energy saving method for controlling a thermostat is illustrated. In this method, the offset value is incremented based on the operating time of the air conditioner.

Not shown in FIG. 3 are the initial steps of the second method embodiment, of storing in a memory at least one temperature offset default value associated with a request for reduced cooling operation. The method also periodically receives the communication of information indicative of the sensed temperature within a space from at least one sensor. The method also determines a temperature value for the space, based on information received from the at least one sensor and at least one temperature offset value when a request for reduced operation has been received within a predetermined time period.

Referring to FIG. 3 at step 200, the second embodiment of a method for controlling a thermostat determines whether the system is in a cool mode in which the air conditioning system is to be operated to control the temperature of a space. The method then determines at step 204 whether it is in a normal mode of operation to control a space temperature, or whether it is in an energy savings mode of reduced operation (e.g., Cool Savings mode, etc.). If the thermostat is in the reduced operation mode, the thermostat proceeds to step 208 to compare if the determined temperature value for the space is above the determined set-point temperature, to determine if there is a call for cooling operation. If there is a call or need for cooling, operation of the air conditioner is initiated. The method of this embodiment uses a compressor run-time counter for tracking the amount of time the compressor runs, and determines at step 212 whether the compressor has run beyond a predetermined time, such as 20 minutes, for example. For a given number of minutes beyond the twenty minute operating time, the software increments a count value at step 220 (up to a user specified maximum set at step 216), which count value may be used in determining an offset value in the calculation of a determined temperature for the space. The offset value may be incremented by a predetermined temperature value corresponding to an incremental time period of operation beyond a minimum threshold time period of operation. For example, the offset may be incremented at least $1/16$ of a degree Fahrenheit for each two-minute time increment of operation beyond a minimum threshold period of at least 15 minutes of operation. The offset value may initially be a default value of 0 degrees, and may be incremented $1/16$ of a degree for every two minutes that the compressor runs beyond twenty minutes in a given cooling cycle. Thus, if the compressor runs for a total of 24 minutes before the set-point temperature is reached, the offset would be 2 degrees plus $2/16$ of a degree, or $2\frac{1}{8}$ degree Fahrenheit. Thus, the longer the compressor runs during cooling operation cycles, the greater will be the offset that is subtracted from the sensed temperature in calculating a determined temperature value for the space. Thus, the determined temperature for the space will be decremented over longer compressor run times, such that the set-point temperature is reached sooner and compressor operation is shortened. During midday when daytime temperatures reach their peak, the air conditioner is less effective and runs longer to cool the space. It is during such periods that longer run times of the air conditioning compressor will occur. The present method curtails operation of the air conditioner during such periods by offsetting the temperature value for the space to help reach the set-point temperature sooner and reduce air conditioning operation. This method accordingly helps to reduce cooling operation during peak energy demand periods.

Figure 4:
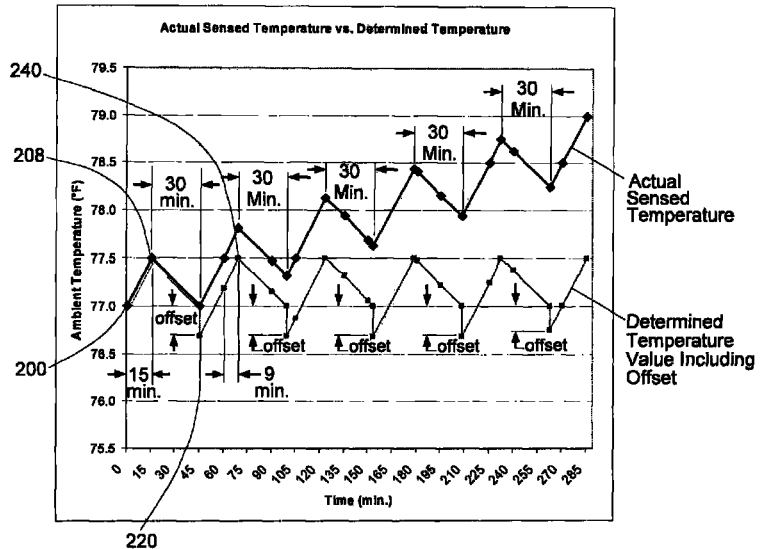
FIG. 4 shows an illustration of a temperature profile provided by another exemplary embodiment of a thermostat and method according to the principles of the present disclosure.

Referring to FIG. 4, an illustration of a temperature profile that may be provided by the above method is shown. A thermostat utilizing the above method is set to a cool mode for conditioning a space, which is initially at 77 degrees Fahrenheit as shown at 200. In this illustration, the outdoor ambient temperature is assumed to be high, such that the space experiences a 2 degree increase per hour or a 0.5 degree Fahrenheit increase to 74.5 degrees in 15 minutes. At 208, the control method for the thermostat determines if there is a call for cooling operation, by checking temperature sensor information and calculating a determined temperature value for the space of 77.5 degrees. Since the 77.5 degree determined temperature value is at least 0.5 degrees above a 77 degree set-point temperature, the thermostat establishes operation of the air conditioner. Because of the high outside ambient conditions, the air conditioner runs for as much as 30 minutes before the space is cooled to a level where the determined temperature value for the space is at the 77 degree set-point temperature, and operation of the air conditioner is discontinued or shut-off. Since the air conditioner was operated for more than 20 minutes, the method increments a count value during operation after 20 minutes, which value may be used to determine an offset value. For example, the offset value may initially be a default of 0 degrees, and may be incremented $\frac{1}{16}$ of a degree for every two minutes that the compressor runs beyond twenty minutes in a given cooling cycle. Thus, the 10 minutes of operation beyond the 20 minute period would result in an offset of $\frac{5}{16}$ of a degree Fahrenheit. At the conclusion of the cooling cycle, the thermostat may calculate a determined temperature value of the space that includes this $\frac{5}{16}$ offset, to arrive at a new determined temperature value of $76\frac{11}{16}$ degrees Fahrenheit at 220.

From point 220, the determined temperature value of the space would again rise in the next 15 minutes by 0.5 degrees, from $76\frac{11}{16}$ degrees to $77\frac{3}{16}$ degrees. After 15 minutes, the determined temperature has not reached the 77.5 degree trigger point, because of the offset value. Thus, the air conditioner will remain off for another 9 minutes before the determined temperature value increases from $77\frac{3}{16}$ degrees to the $77\frac{1}{2}$ degree trigger point at 240. Thus, the offset causes the air conditioner off time to increase from 15 minutes to 24 minutes. Once the determined temperature value reaches 77.5 degrees, the thermostat will again establish operation of the air conditioner, which will again run for 30 minutes to cool the space until the determined temperature value is lowered to 77 degrees. The method would again increment the offset value $\frac{1}{16}$ of a degree for every two minutes of operation beyond twenty minutes in the cooling cycle, to result in a total offset value of $\frac{10}{16}$ of a degree Fahrenheit. This method of offsetting the sensed temperature for the space is repeated over five 30-minute cooling cycles, after which a predetermined maximum temperature offset is reached, which in this embodiment is 1½ degrees. In the 280 minute time period in which the air conditioner was operated for five 30-minute cycles, the air conditioner remained off after each cycle for a period of 24 minutes instead of only 15 minutes. This resulted in 45 minutes of additional off time, in exchange for an increase of only 1.5 degrees in the actual sensed temperature for the space.

Figure 5:
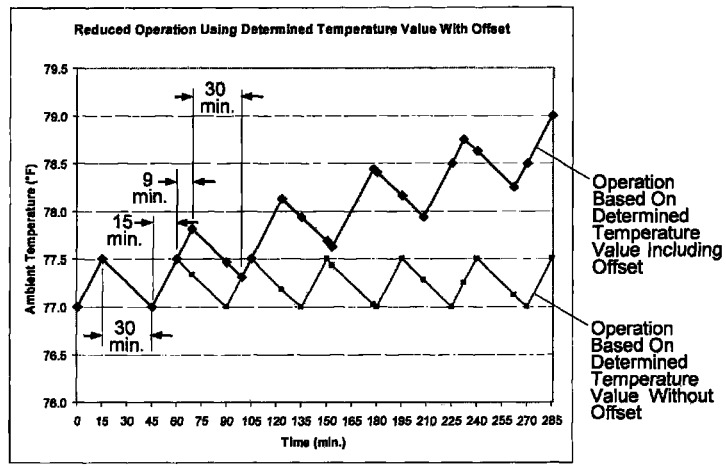
FIG. 5 shows a graph illustrating the reduced operation of an air conditioner system using a determined temperature value including an offset.

Referring to FIG. 5, the above method for controlling operation based on a determined temperature value including an offset provided five 30-minute cycles in a time period that would normally have six 30-minute cycles based on a determined temperature absent any offset. Thus, in mid-day peak-energy demand situations when elevated outside ambient temperatures cause air conditioners to run for longer cycle periods, the above method results in a reduction in operation of 17 percent. In such a method, the request for reduced operation may implemented simply by a utility-provider signal to enter the thermostat into the incremental offset mode of operation, or by the user setting the thermostat to the incremental mode of operation. Thus, a user may be able to initiate the request for reduced mode of operation, independent of any signal from a utility provider. Moreover, the thermostat provides for such reduced operation only during day time periods in which elevated temperatures cause the air conditioner to run longer cycles, and therefore selectively reduces operation based on outside ambient temperatures that affect peak energy demand periods, without requiring the use of any outside ambient temperature sensor.

Figure 6:
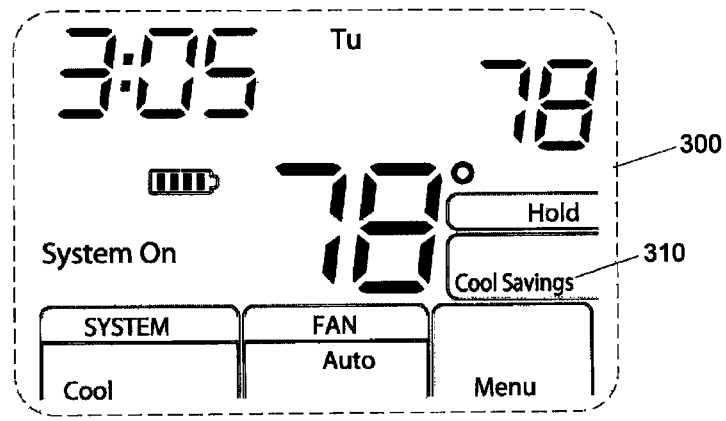
FIG. 6 shows an exemplary embodiment of a thermostat provided with a display device configured to display an icon indicating that the thermostat has been selectively set to the reduced mode of operation.
Figure 7:
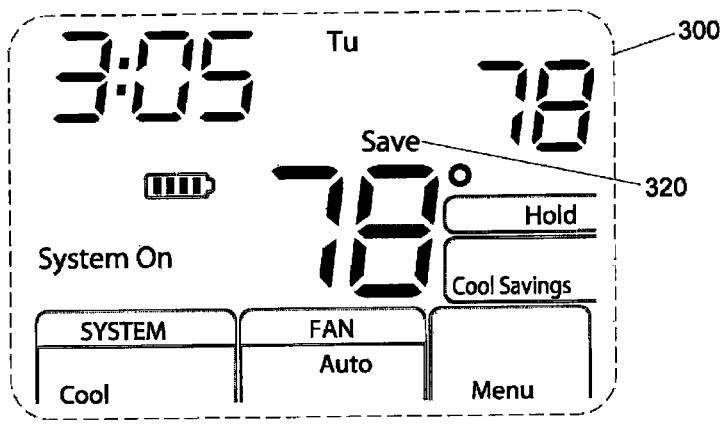
FIG. 7 shows an exemplary embodiment of a thermostat provided with a display device configured to display an icon indicating that the thermostat is in a reduced mode of operation.

In another aspect of the present disclosure, the thermostat is further provided with a display device 300 as shown in FIG. 6, which is configured to display an icon 310 indicating that the thermostat is in the reduced mode of operation. For example, the display may show the words "Cool Savings" to indicate that the reduced operation mode has been selected or enabled. Referring to FIG. 7, the thermostat display device 300 has been further configured to display an Icon 320 to indicate when the thermostat has received a request for reduced operation. For example, the display device may show the word "Save" to indicate that the thermostat is controlling operation using the determined temperature value for the space to reduce air conditioner operation. In this manner, the reduced mode of operation is transparent, since the displayed set-point temperature setting and displayed "determined temperature value" still appear the same. The "Save" icon provides an inconspicuous indication that air conditioning operation has been curtailed, in a manner that will not alert all occupants of the space to avoid the temptation by such occupants to override the temperature setting.

The methods described herein may be implemented in a variety of different control systems, controllers, thermostats, processors, and/or microprocessors, while employing one or more of the aspects described herein to, for example, provide energy cost savings. It should be appreciated that the embodiments of controllers described herein generally include a processor and memory. More specifically, while several of the controller embodiments are referred to herein as thermostats, it should be appreciated that the processor performing the methods herein may include any type of controller associated with a climate control appliance. The controller, for example, may be spaced apart from the climate control appliance, incorporated with the climate control appliance, and/or other devices in communication with the climate control appliance.

Figure 8:
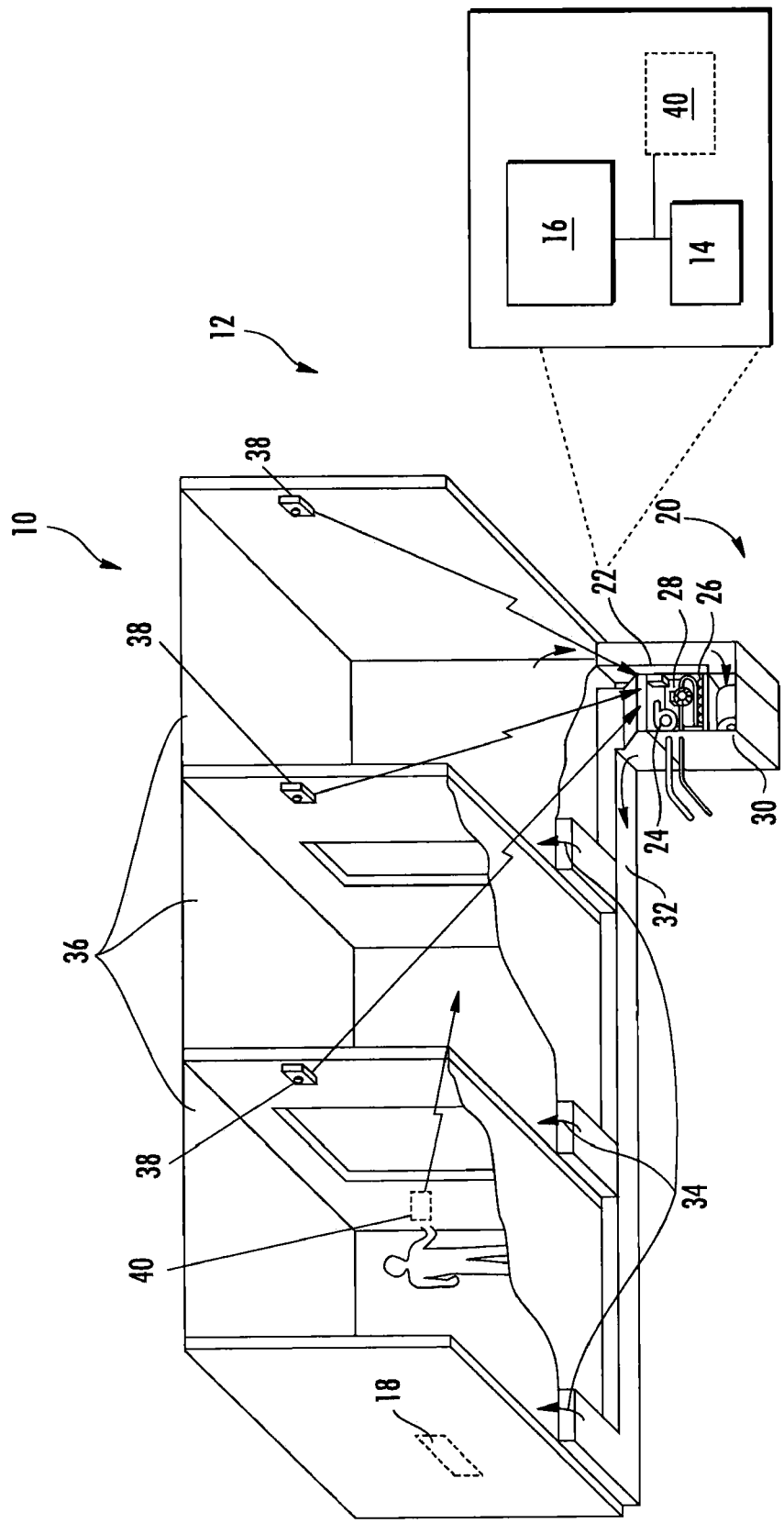
FIG. 8 shows a cut away view of an exemplary embodiment of a system, which includes a control system to determine an artificial temperature.

According to one example embodiment, a system 10 is illustrated in FIG. 8. As shown, the system 10 includes a space defined by several rooms 36 of a building, such as a home, office building, or other structure. The system 10 includes a climate control appliance 20 and a control system 12 to control the climate control appliance 20. The climate control appliance 20 includes a circulation blower 30, a heating unit 26, and a cooling unit 24. It should be appreciated that in other embodiments, the heating unit 26 or the cooling unit 24 may be omitted. One or both of the heating unit 26 and the cooling unit 24 are operable by the consumption of energy, such as electricity. Accordingly, the methods described herein for providing energy cost savings may be employed in the control of the climate control appliance 20, by control system 12.

The control system 12 includes a controller 22. In the exemplary embodiment, the controller 22 is mounted within the climate control appliance 20. In one or more other embodiments, the controller 22 may be includes within a thermostat, such as one or more of the thermostats described above. As shown, an exemplary thermostat 18 is shown in broken lines along the wall of one of the rooms 36, and spaced apart from controller 22. Additionally, the controller 22 may constitute a building controller, operable to control air condition equipment, heating equipment, and/or circulating equipment, while providing status information (e.g., an artificial temperature, etc.) to a remote display device, such as any of a wide range of portable communication devices, e.g., a smart phone, laptop, tablet, Blackberry® device, Android® device, an iPhone® device, iPad® tablet, other communication device that may be able to communicate using one or more of a Wi-Fi network, 802.11 based wireless communication, WiMAX, Bluetooth communication, Zigbee communication, subscriber based wireless data communication networks such as the 3G or 4G network, PCS network, EDGE network or other wireless communication means, etc.

In the exemplary embodiment, consistent with the microprocessor described above, the controller 22 includes a processor 14 and a memory 16 coupled to the processor 14. The processor 14 may include, without limitation, a microprocessor, microcontroller, or other processing device. Methods disclosed herein may be encoded as firmware into the processor 14 and/or executable instructions embodied in computer-readable media, contained within the processor 14, and/or separate from the processor 14 in one or more associated memories 16, to thereby configure the processor 14 to perform the specific method, process, and/or function. Further, memory 16 may be provided to store, for example, one or more temperature offsets, set-point temperatures, artificial temperatures, predetermined intervals, threshold, run-time values, and/or other information related to the operation of the climate control appliance 20, etc.

The control system 22 further includes a display device 40. The display device X may include, for example, a liquid crystal display (LCD), a light-emitting diode (LED) display, an organic LED (OLED) display, and/or an "electrical-ink" display, etc. The display device 40 is configured to display information about the control system 12, such as for example, an artificial temperature, a set-point temperature, a sensed temperature, etc.

The display device 40 may be local and/or incorporated into the controller 22, for example, as the display device of a thermostat, or separate and/or spaced apart from the controller 22. In one example, the display device 40, as shown, is a portable and/or remote display device spaced apart from the controller 22. In particular, the display device 40 may include, without limitation, a portable communication device, such as a laptop, a tablet computer, a smartphone, or other portable device. The display device 40 may be coupled, wired and/or or wirelessly, to the processor 14. In this manner, a user may be able to monitor one or more aspects of the climate control appliance 20, away from the controller 22 and/or the climate control appliance 20, or even away or remote from the building.

The exemplary control system further includes three sensors 38, which are provided to sense the temperature within the space and transit the sensed temperature to the controller 22. The sensors 38 are coupled to the processor 14 through a wired and/or wireless connection. In one or more embodiments, each of the processor 14, the display device 40, and/or the sensors 38 communicate with one another through a wired and/or wireless network. In this manner, the sensors 38 and/or display device 40 may be mounted remote and/or spaced apart from the controller 22, and more particularly, the processor 14. Furthermore, a network accessibility to the control system 12 (e.g., through the Internet, a LAN, a WAN, a Wi-Fi network, a Bluetooth network, a utility network, etc.) may provide access to the processor 14, for example, to a utility provider or a user to provide one or more reduced operation requests. Additionally, or alternately, the control system 12 may be segregated from a network to limit access to the control system 12. In at least one embodiment, one or more of sensors 38 may be incorporated within a housing of controller 22. For example, a thermostat may include a temperature sensor to sense a temperature within a space.

The control system described with reference to FIG. 8 includes processor 14 to perform one or more of the above methods for enabling a request for reduce cooling or heating operation to be received and implemented into operation of the climate control appliance 20. It should be appreciated that one or more aspects of the exemplary control system 12 may be altered without departing from the scope of the present disclosure.

Advantages of the above described embodiments and improvements should be readily apparent to one skilled in the art, as to enabling load-shedding capability to a thermostat. Additional design considerations may be incorporated without departing from the spirit and scope of the invention. The description in this disclosure is merely exemplary in nature and, thus, variations are not to be regarded as a departure from the spirit and scope of the disclosure. Accordingly, it is not intended that the invention be limited by the particular embodiments or forms described above, but by the appended claims.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control system for controlling a climate control appliance for heating and/or cooling a space, the control system comprising:
    at least one sensor configured to sense a temperature associated with the space;
    a memory for storing at least one temperature offset; and
    a processor coupled to the memory and in communication with the at least one sensor, the processor configured to receive a reduced operation request and to receive a sensed temperature from the at least one sensor, the processor configured to, based on whether the reduced operation request has been received within a predetermined time period, perform the following: determine an artificial temperature by applying at least one stored temperature offset associated with the reduced operation request to the sensed temperature, and, in response to the reduced operation request, to reduce operation of the climate control appliance based on a comparison of a set-point temperature and the artificial temperature during a reduced operation interval within the predetermined time period;
    wherein the application of the at least one stored temperature offset is obscured by a representation of the artificial temperature as the sensed temperature during the reduced operation interval.

2. The control system of claim 1, further comprising a display device coupled to the processor and configured to display the set-point temperature and the artificial temperature, but not the sensed temperature of the space, during the reduced operation interval.

3. The control system of claim 2, further comprising a thermostat coupled to the climate control appliance, the thermostat including the memory, the processor, and the display device.

4. The control system of claim 2, further comprising a portable communication device including the display device, the portable communication device in communication with the processor.

5. The control system of claim 2, wherein the display device is further configured to display an indicator indicating the control system is operating in accordance with the reduced operation request.

6. The control system of claim 1, wherein:
    the at least one temperature offset is in the range of about 1 to about 8 degrees Fahrenheit; and/or
    the at least one temperature offset value comprises a plurality of incrementally varying offsets.

7. The control system of claim 1, wherein:
    the processor is configured to operate the climate control appliance based on the artificial temperature during the reduced operation interval when the reduced operation requested was received within the predetermined time period; and
    the processor is further configured to operate the climate control appliance based on a comparison of the set-point temperature and the sensed temperature after the reduced operation interval or when the reduced operation request was received outside of the predetermined time period.

8. The control system of claim 1, wherein the processor is further configured to discontinue operation of the climate control appliance for at least a minimum off-time period after the artificial temperature has substantially reached the set-point temperature.

9. The control system of claim 1, wherein:
the processor is configured to wirelessly communicate with the at least one sensor, when the at least one sensor is mounted remotely therefrom; and/or
the processor is configured to wirelessly transmit the artificial temperature to a display device spaced apart from the processor.

10. A control system for controlling a climate control appliance for heating and/or cooling a space, the control system comprising:
a processor configured to set an energy savings mode to an enabled setting in response to receiving a request for reduced operation from a user of the control system and/or to receive a signal from a utility provider that includes a request for reduced operation;
the processor configured to, based on one of the following: (a) the energy savings mode of the climate control appliance having been enabled in response to a request for reduced operation, or (b) the energy savings mode of the climate control appliance having been enabled before a request for reduced operation is received:
periodically receive a sensed temperature value from at least one sensor indicative of a temperature within the space, offset the sensed temperature value by at least one sensed temperature offset value when a request for reduced operation has been received, to thereby determine an artificial temperature value for the space, and obscure the offsetting of the sensed temperature value by representing the artificial temperature as the sensed temperature; and
discontinue heating or cooling operation for the space where the determined artificial temperature value has reached or is within a fraction of a degree above or below a set-point temperature.

11. The control system of claim 10, wherein:
the processor is configured to receive a request for reduced operation from a utility provider and to receive a request for reduced operation from a user of the control system, whereby the user may initiate the request for reduced operation independent of any request for reduced operation from the utility provider; and/or
the processor further includes the at least one sensed temperature offset value in the determination of the artificial temperature value for the space for a predetermined time period after receiving the request for reduced operation.

12. A controller for controlling a climate control appliance for heating and/or cooling a space, the controller comprising:
a memory for storing at least one temperature offset; and
a processor coupled to the memory, the processor configured to receive a reduced operation request from at least one of a utility provider and a user after a reduced operation interval has begun, to receive a sensed temperature of the space from at least one sensor, and to determine an artificial temperature by applying to the sensed temperature at least one stored temperature offset associated with the reduced operation request,
wherein the processor is further configured to, in response to the reduced operation request, reduce operation of the climate control appliance based on a comparison of a set-point temperature and the artificial temperature, and conceal, in displaying the artificial temperature as the sensed temperature, the application of the at least one stored temperature offset, during the reduced operation interval.

13. The controller of claim 12, wherein:
the memory includes at least two set-point temperatures, each of the set-point temperatures associated with different time periods of operation; and
the processor is configured to select said set-point temperatures from the at least two set-point temperatures.

14. The controller of claim 12, further comprising a display device coupled to the processor, the display device configured to display the artificial temperature to the user.

15. A thermostat comprising the controller of claim 14.

16. The controller of claim 12, wherein the processor is further configured to determine the at least one temperature offset by incrementing a minimum offset by a fraction of a degree Fahrenheit for each individual time increment that a run-time exceeds a minimum threshold.

17. The controller of claim 12, wherein the processor is further configured to calculate the at least one temperature offset based on a prior run-time of the climate control appliance and to store the at least one temperature offset in the memory.

18. A controller for controlling a climate control appliance for heating and/or cooling a space, the controller comprising:
a processor configured to set an energy savings mode to an enabled setting in response to receiving a request for reduced operation from a user of the controller and/or to receive a signal from a utility provider that includes a request for reduced operation;
the processor configured to periodically receive a sensed temperature value from at least one sensor indicative of a temperature within the space, where the processor offsets the sensed temperature value by at least one sensed temperature offset value when a request for reduced operation has been received, to thereby determine an artificial temperature value for the space, and conceals the at least one sensed temperature offset value in the artificial temperature by representing the artificial temperature as the sensed temperature; and
the processor configured to discontinue heating or cooling operation for the space where the determined artificial temperature value has reached or is within a fraction of a degree above or below a set-point temperature;
wherein the controller remains enabled in the energy savings mode after the request for reduced operation has been discontinued.

19. The controller of claim 18, wherein:
the processor is configured to receive a request for reduced operation from a utility provider and to receive a request for reduced operation from a user of the controller, whereby the user may initiate the request for reduced operation independent of any request for reduced operation from the utility provider; and/or
the processor further includes the at least one sensed temperature offset value in the determination of the artificial temperature value for the space for a predetermined time period after receiving the request for reduced operation.

20. A method for controlling operation of a climate control appliance for heating and/or cooling a space, the method comprising:
sensing, at a sensor, a temperature associated with the space;
receiving a reduced operation request within a predetermined time period;
determining, at a processor, an artificial temperature based on the sensed temperature and a temperature offset associated with the reduced operation request; and
in response to the reduced operation request, operating the climate control appliance based on a comparison of the artificial temperature and a set-point temperature and concealing the temperature offset in the artificial temperature by representing the artificial temperature as the sensed temperature for at least a reduced operation interval.

21. The method of claim 20, further comprising displaying, at a display device, the artificial temperature and the set-point temperature, but not the sensed temperature, during the reduced operation interval.

22. The method of claim 20, wherein:
receiving the reduced operation request includes receiving the reduced operation request from at least one of a utility provider and a user; and
the method further comprises transmitting, via at least one network, the artificial temperature to a display device spaced apart from the processor.

23. A method for controlling operation of a heating and/or cooling system, the method comprising:
a controller of the heating and/or cooling system determining an artificial temperature value for a space based on (a) sensed temperature value information indicative of a sensed temperature within the space and (b) a temperature offset value associated with a reduced operation request when the controller has received the request for reduced operation from a user or a utility provider within a predetermined time period;
when a reduced operation interval is in effect within the predetermined time period, obscuring a difference between the determined artificial temperature value and sensed temperature by representing the determined artificial temperature value as the sensed temperature; and
discontinuing operation of the heating and/or cooling system for the space when the determined artificial temperature value has reached or is within a fraction of a degree above or below a set-point temperature;
the method performed by the controller using a processor and memory to control operation of the heating and/or cooling system.

24. The method of claim 23, further comprising:
storing in the memory at least one sensed temperature offset value associated with an energy savings mode enabled by a user of the controller; and/or
setting an energy savings mode to an enabled setting in response to receiving a request for reduced operation from a user of the controller; and/or
displaying on a display device the determined artificial temperature value for the space instead of the actual sensed temperature of the space, and further displaying the user selected set point temperature.

25. The method of claim 23, wherein:
for a predetermined time period after a request for reduced operation has been received, the at least one sensed temperature offset value is added to the sensed temperature value in the determination of an artificial temperature value for the space; and/or
the method includes allowing reduced cooling operation only during day time periods of elevated temperatures, to thereby selectively reduce operation based on outside ambient temperatures without requiring the use of any outside ambient temperature sensor.

* * * * *